J. HUEBNER.
PROCESS OF MANUFACTURING VEHICLE TIRES.
APPLICATION FILED AUG. 26, 1910.
1,009,752.
Patented Nov. 28, 1911.
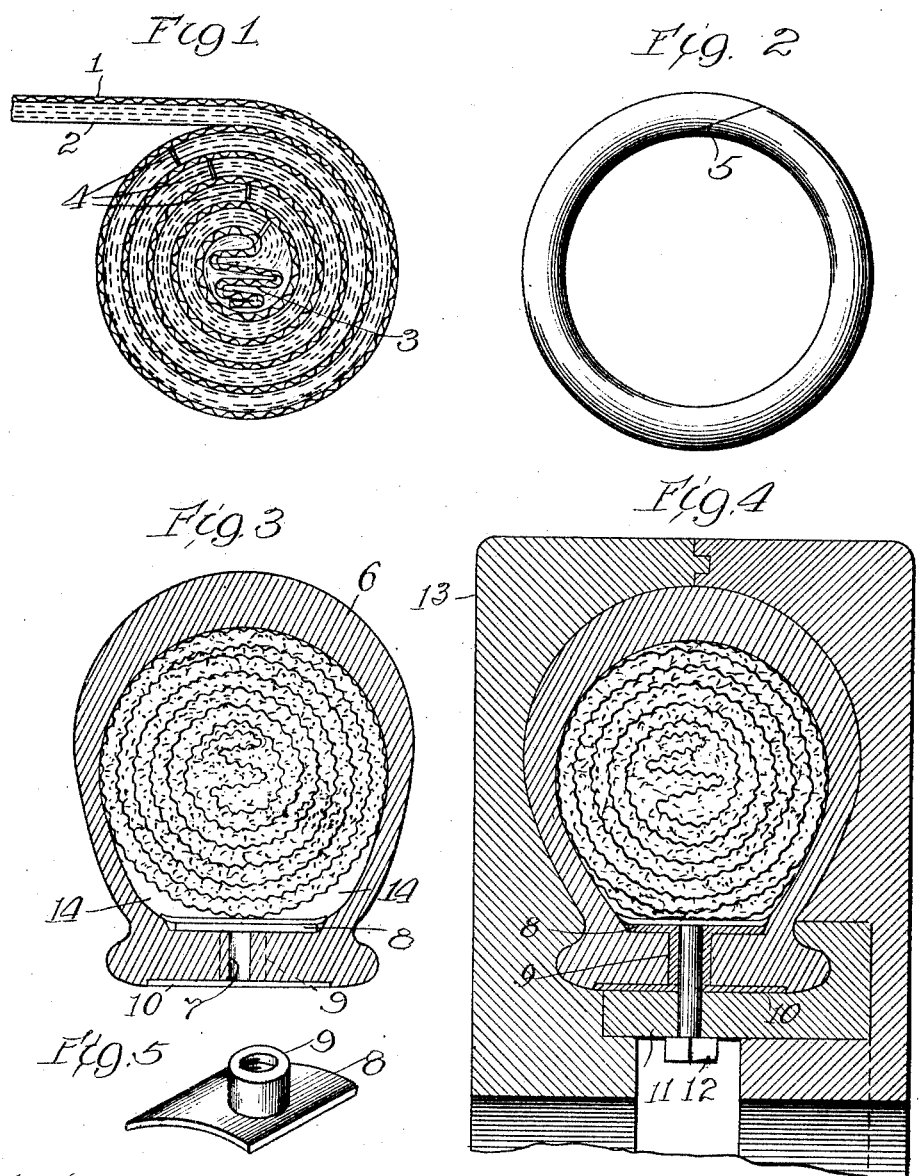

UNITED STATES PATENT OFFICE.

JOHAN HUEBNER, OF CHICAGO, ILLINOIS.

PROCESS OF MANUFACTURING VEHICLE-TIRES.

1,009,752.  Specification of Letters Patent.  Patented Nov. 28, 1911.

Application filed August 26, 1910. Serial No. 579,050.

*To all whom it may concern:*

Be it known that I, JOHAN HUEBNER, a citizen of the United States, and residing at Chicago, in the county of Cook and State of Illinois, have invented a new and useful Improvement in Processes of Manufacturing Vehicle-Tires, of which the following is a complete specification.

The main objects of this invention are to provide a process of manufacturing vehicle tires, whereby a very strong and resilient tire may be produced; to provide a process whereby a tire having a sponge rubber filler may be produced which will be uniform in character and of like resiliency throughout; to provide a process of manufacturing vehicle tires having a sponge rubber filling which will overcome any tendency toward unevenness in the spongy formation and produce a tire in which the road pressure will be evenly distributed throughout the spongy mass; and to provide a very cheap, simple and durable tire, having a great amount of resiliency and not likely to get out of repair.

A specific construction formed in accordance with this invention is illustrated in the accompanying drawings, in which:

Figure 1 is a transverse section of the tire filler partly formed, and enlarged for clearness of illustration. Fig. 2 is a side elevation of the completed filler ready to be placed in the outer casing. Fig. 3 is a cross section of the filler and outer casing, before vulcanization. Fig. 4 is a cross section of the tire and vulcanizing mold or form, after vulcanization of the tire. Fig. 5 is a perspective view of one of the attaching plates.

In carrying out the process, a sheet 1 of flexible material, such for instance as canvas or other suitable fabric, is impregnated with a rubber solution and is covered or coated on one side thereof with a layer of rubber compound 2. One edge of the rubber coated sheet is then folded into a plurality of folds to provide a central core 3, and the sheet is then wound around the core 3 in a spiral or convolute form until the filler is of sufficient diameter. During the winding the coated sheet is parted or cut longitudinally of the roll at a plurality of points 4, which are out of radial alinement with each other, and the edges formed by each cut are arranged closely together. With this construction the filler may expand during vulcanization without danger of distorting the filler.

The rubber compound or coating 2 is preferably formed of a combination of rubber and ammonium carbonate in the proportion of one part of the carbonate to twelve parts of rubber, though the proportion may be varied according to the quality of the rubber.

When the filler has been formed to the desired diameter its ends are cut slanting so as to overlap, as shown at 5 in Fig. 2, and the filler is then placed in an outer casing 6 of rubber which has been previously formed to the desired shape of the tire, and is open at 7 along its inner circumference. Attaching plates 8, having internally threaded studs or bosses 9 on one side thereof, are placed in the casing 6 at suitable distances apart and with the studs projecting into the slot or opening 7, the sides of which may be cut away to receive the studs.

A strip 10 of rubber coated fabric or other suitable material is then placed over the opening 7 to seal the same, and the casing is mounted on a ring 11 of a diameter to fit closely to the inner circumference of the casing, and bolts 12 pass through said ring and are secured to the studs 9, thereby holding the edges of the casing together.

An annular vulcanizing mold or form 13 is divided into two parts in a plane at right angles to its axis, and is adapted to fit closely over the casing and ring 11.

When the filler is placed in the casing it does not quite fill the casing, but leaves spaces 14 therein into which the filler may expand during vulcanization. When the casing is placed within the vulcanizing mold and heat is applied to the mold, the ammonia in the rubber coating on the fabric causes the rubber to expand into a sponge like mass between the layers of fabric and entirely fill the casing, and the layers of the filler are vulcanized together and to the casing, thereby forming a unitary mass. The attaching plates are also firmly embedded in the rubber and serve to attach the tire to the wheel.

It is immaterial if the rubber coating on the fabric does not expand in the same degree at all points, since the sponge rubber is confined between the layers of fabric which tend to transmit the pressure evenly throughout the tire.

The tire thus formed will have an inner portion or filler comprising a plurality of convolutions of sponge rubber, separated by convolutions of fabric. The parts or cuts 4 in the fabric permit the filler to expand evenly throughout.

While I have shown and described but one specific method of carrying out my invention, it will be understood that various details of the method described may be varied or omitted without departing from the scope of the claims.

I claim:

1. A process of manufacturing tires, comprising coating a sheet of fabric with a layer of material adapted to assume a cellular form upon the application of heat, forming the coated sheet into an annular roll, placing an outer casing on the roll, and applying heat to the structure thus formed to vulcanize the layers together and to the casing and form the coating into a cellular mass.

2. A process of manufacturing tires, comprising coating a sheet of flexible material with an admixture of rubber and ammonia, winding the coated sheet into a roll and bringing the ends of the roll together, placing an outer casing of rubber on the roll and vulcanizing the layers of the roll together and to the casing, thereby forming the coating into sponge rubber.

3. A process of manufacturing tires, comprising forming a filler of a plurality of convolutions of flexible material coated with a layer of rubber and ammonia, placing an outer rubber casing on the filler, and heating the structure thus formed to convert the rubber coating into sponge rubber and vulcanize the parts together.

4. A process of manufacturing tires, comprising coating a sheet of flexible material with a compound of rubber and ammonia, winding the sheet into a roll, and bringing the ends of the roll together, placing the roll into an outer rubber casing, and placing the structure thus formed into a vulcanizing form and vulcanizing the parts together and converting the rubber compound into sponge rubber.

5. A process of manufacturing tires, comprising coating a sheet of flexible material with a rubber compound, slitting the sheet at a plurality of points and winding it into a roll, joining the ends of the roll and placing it into a rubber casing, vulcanizing the convolutions of the roll together and to the casing, and converting the rubber compound into sponge rubber.

In witness whereof I have hereunto subscribed my name in the presence of two witnesses.

JOHAN HUEBNER.

Witnesses:
CHARLES J. MOHR,
JOSEPH KING.